United States Patent
Chang

(10) Patent No.: US 6,170,523 B1
(45) Date of Patent: Jan. 9, 2001

(54) DEVICE FOR LIMITING THE TEMPERATURE OF THE OUTPUT WATER OF A COLD AND HOT WATER MIXING VALVE

(76) Inventor: Chia-Bo Chang, No. 335, Chang-Ting Road, Lukang, Changhua Hsien (TW)

( * ) Notice: Under 35 U.S.C. 154(b), the term of this patent shall be extended for 0 days.

(21) Appl. No.: 09/405,481

(22) Filed: Sep. 24, 1999

(51) Int. Cl.[7] ..................................................... F16K 11/06
(52) U.S. Cl. .................................. 137/625.17; 137/625.4; 251/288
(58) Field of Search ........................ 251/285, 288; 137/625.17, 625.4

(56) References Cited

U.S. PATENT DOCUMENTS

| | | | |
|---|---|---|---|
| 4,423,752 | * 1/1984 | Psarouthakis | 251/288 X |
| 4,813,455 | * 3/1989 | Iqbal | 137/625.17 |
| 5,010,917 | * 4/1991 | Iqbal | 251/288 X |
| 5,326,075 | * 7/1994 | Goff | 251/285 |
| 5,329,958 | * 7/1994 | Bosio | 137/625.17 X |
| 5,368,071 | * 11/1994 | Hsieh | 137/625.4 X |
| 5,402,827 | * 4/1995 | Gonzalez | 137/625.17 |
| 5,477,885 | * 12/1995 | Knapp | 251/288 X |
| 5,692,536 | * 12/1997 | Tokarz | 251/288 X |
| 5,967,184 | * 10/1999 | Chang | 137/625.17 |

* cited by examiner

*Primary Examiner*—John Rivell
*Assistant Examiner*—Meredith H Schoenfeld
(74) *Attorney, Agent, or Firm*—Pro-Techtor International Services

(57) ABSTRACT

A water temperature regulating valve for limiting the maximum temperature of the water output. A temperature limiting cap is installed above the cartridge of the regulating valve. The limiting cap restricts the rotation of a control rod device pivotally installed in the barrel portion of the valve. When the limiting temperature is to be reset, the user removes the cap, rotates it to the desired position, and reinstalls the cap.

1 Claim, 4 Drawing Sheets

DEVICE FOR LIMITING THE TEMPERATURE OF THE OUTPUT WATER OF A COLD AND HOT WATER MIXING VALVE

BACKGROUND OF INVENTION

The present invention relates to a device for limiting the temperature of the output water of a cold and hot water mixing valve, wherein after the regulating valve is assembled with a fulcrum, a cap can be conveniently taken out to readjust the limiting temperature.

The prior art mixing valve serves to operate a pair of ceramic disks which are stacked tightly together. By the relative displacement between the disks, one or two of the cold and hot water inlets are communicated with the outlet of the mixing water, thus cold and hot water are mixed and the amount of water can be regulated.

Although the operation of the prior art cold and hot water regulating valve is easy and convenient, some defects in safety exist. For example, the regulating valve can be moved in a vertical direction regardless of the temperature of the water. This is possibly dangerous to children.

In order to improve safety in using water, some novel designs are invented so that a regulating valve serves to regulate water temperature, such as that disclosed in U.S. Ser. No. 08/806,168 "WATER TEMPERATURE AND FLOW RATE CONTROL DEVICE" disclosed by the inventor of the present invention, wherein a temperature confining cap is installed at the cartridge of the regulating valve for regulating the rotation angle in the horizontal direction of a control rod so that as a fulcrum is opened, high temperature water will not flow out to harm the user.

Although the aforesaid structure protects the user, a problem is induced as the structure is assembled, in that it is difficult to reset the cap. As shown in FIG. 6, when the cap 2 is connected to the cartridge 1 of a regulating valve, the valve body is installed in the cap 92 within the cavity 91 and then is fixed by a stud 92. Then, it is further connected to a cover 93 and a handle 94. After assembling, the cap 2 is embedded into the hole of the cap 92. Thus, the cap is difficult to rotate for resetting the limit temperature. Moreover, the scale 16 at the periphery of the shoulder of the cartridge I has been shielded completely. Therefore, when the user desires to reset the temperature setting, the user must detach the valve from the fulcrum. This is very inconvenient.

Accordingly, the primary object of the present invention is to provide a device for limiting the temperature of the output water of a cold and hot water mixing valve. The scale for showing the temperature setting is set at the top of the cap. A circular trench is installed at the cap as a force applying portion for opening the cap. Thus, when the valve is installed to a fulcrum, and the water temperature limit needs to be reset, the valve does not have to be detached. The user may rotate the cap and monitor the temperature scale. Therefore, the difficulties in the prior art can be overcome.

The various objects and advantages of the present invention will be more readily understood from the following detailed description when read in conjunction with the appended drawings.

DETAILED DESCRIPTION OF THE PREFERRED EMBODIMENT

Figure 1:
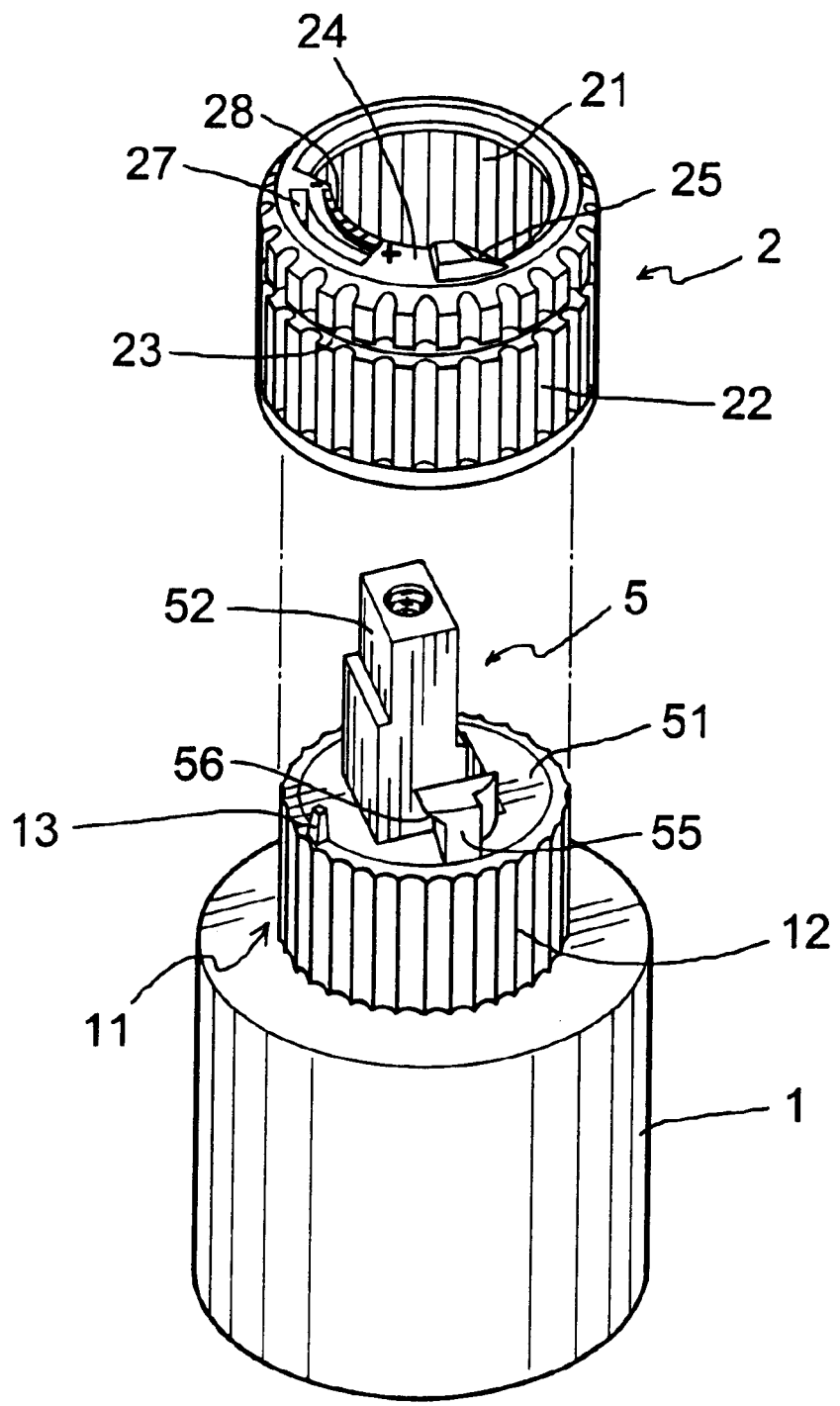
FIG. 1 is an exploded perspective view of the preferred embodiment of the present invention.
Figure 2:
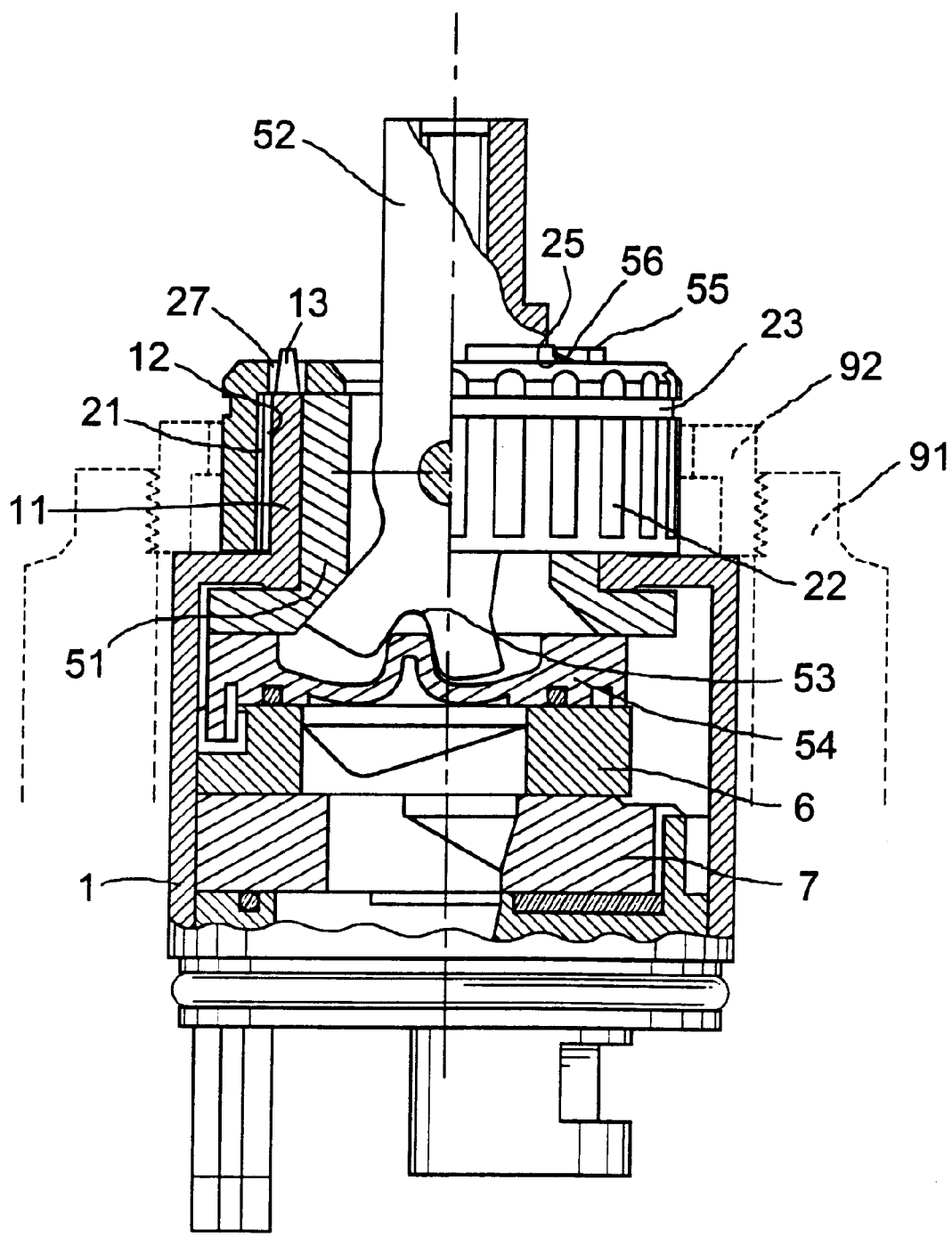
FIG. 2 is a lateral cross sectional view of the valve of the present invention.
Figure 3:
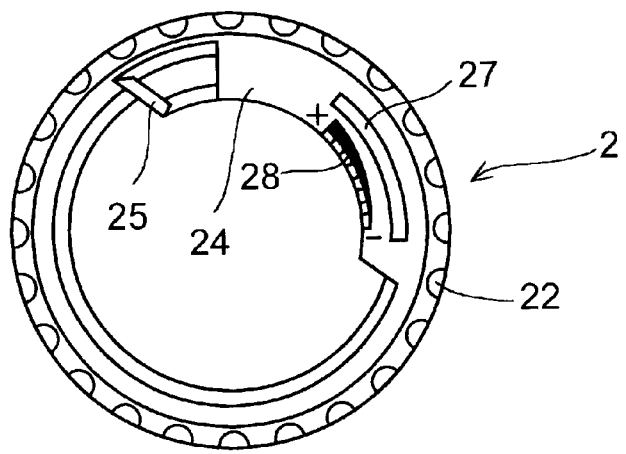
FIG. 3 is an elevation view of the temperature limiting cap.
Figure 4:
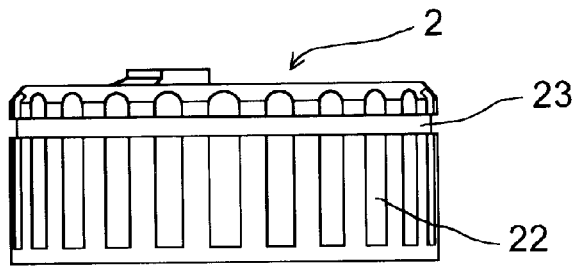
FIG. 4 is a side view of the temperature limiting cap.
Figure 5:
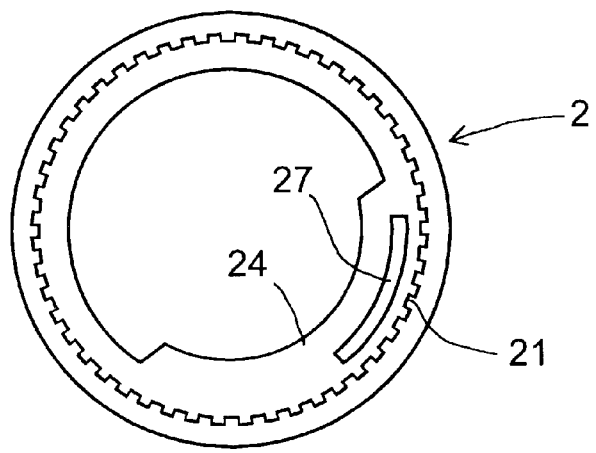
FIG. 5 is an upper view of the temperature limiting cap.
Figure 6:
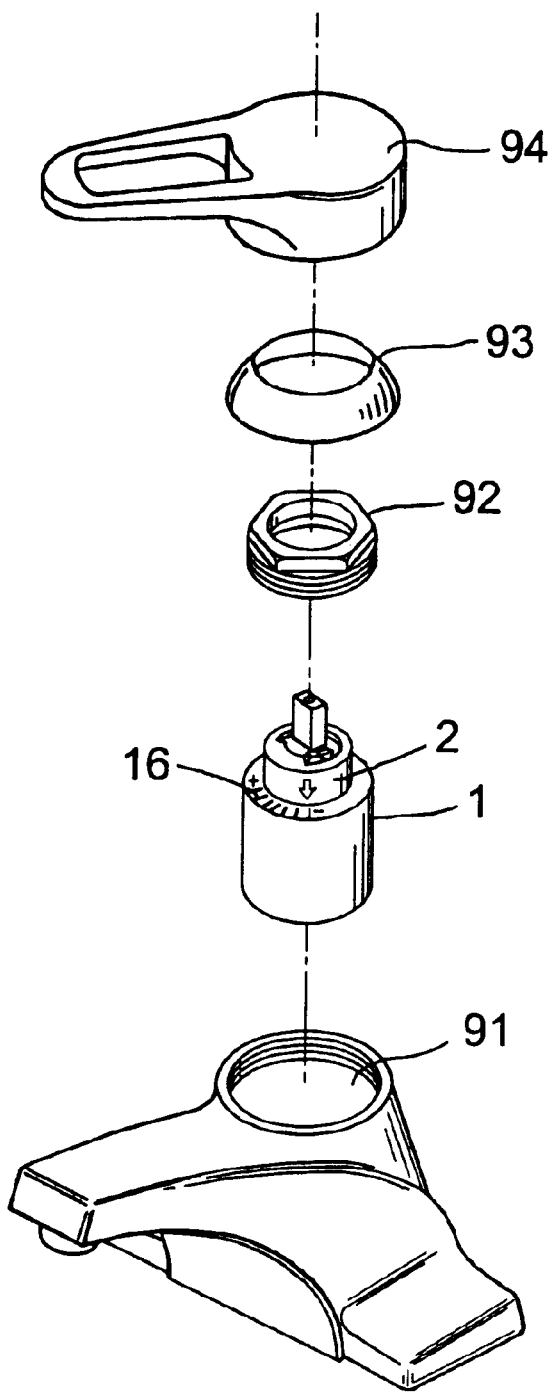
FIG. 6 is an exploded perspective view showing a prior art cold and hot water regulating valve.

With reference chiefly to FIGS. 1 and 2, a temperature limiting cap 2 is installed above the cartridge 1 of the water temperature regulating valve for limiting the maximum water temperature. A barrel portion 11 with a diameter smaller than the outer diameter of the cartridge is installed at the upper end of the cartridge 1 of the regulating valve. A control rod device 5 is pivotally installed within the barrel portion. In the control rod device, at the central axis of a seat 51, a pivoting control rod 52 is extended upward. The lower end of the control rod 52 has a fork 53. The fork 53 is connected to a plate 54 so that a movable disk 6 is driven to rotate on a fixing disk 7. Teeth are formed on the surface of the barrel portion 11. A pin 13 extends upward from the barrel portion 11. On the top of the seat 51 of the control rod device 5 there is a catch 55. The top end of the catch 55 has a hook 56.

Teeth 21 are also formed around the periphery of the inner hole of the temperature limiting cap 2. These teeth 21 engage the barrel portion teeth 11. Non-slip texture 12 is formed on the outer surface of the temperature limiting cap 2, and a circular groove 23 is installed above the textured portion 12. The top surface of the temperature limiting cap 2 includes a rotation limiting flange 24. The flange 24 includes a cambered portion 25 which conforms with the shape of the hook 56 of the catch 55. Moreover, a hollow cambered groove 27 is installed on the flange 22, and a mark texture 28 is installed at a rim portion of the groove 27.

According to the aforesaid structure, when the cap 2 is assembled with the barrel portion 22 of the cartridge 1, the cap 2 is axially aligned above the barrel portion 11 and is positioned by the engagement of the teeth 12 and 21 so as to prevent the free rotation of the cap 2. The pin 13 passes through the cambered groove 27 and protrudes out of the top surface of the flange 24 to be aligned with one of the marks 28. Accordingly, as the valve is operated, the rotation of the cap 2 restricts the displacement of the catch 55 so as to restrict the rotation of the control rod device 5. Thus the maximum temperature of the water is limited. The hook 56 of the catch 55 engages the cambered portion 25 of the cap.

The regulating valve is installed within the fulcrum cavity 91 and is confined by a nut 92. When the limiting temperature is to be reset, the user may use the circular groove 23 on the cap of the nut 92. The cap 2 can be opened by an opener so as to separate the teeth 12 and 21. Then the cap is rotated to the desired position, and the teeth 12 and 21 are again engaged. By reference to the pin 12 at the top of the cap and the marks 28, the water temperature can be regulated and monitored.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A temperature limiting device for the output water of a cold and hot water regulating valve comprising:

a barrel portion installed at an upper end of a cartridge of said regulating valve, a control rod device pivotally installed within said barrel portion, said control rod device includes an upward extended control rod pivotally installed at a central axis of said control rod device, teeth formed on a surface of said barrel portion, and a pin extended upward from an upper end of said barrel portion, a catch protrudes from a top of a seat of said barrel portion, and a cap mounted on said barrel portion; wherein said cap includes teeth formed around the periphery of an inner hole in said cap, said cap includes a groove that receives said pin, and a top surface of said cap includes a flange, such that said teeth of said barrel portion mesh with said teeth on said periphery of said inner hole of said cap such that movement of said cap relative to said barrel is prohibited, and when said control rod is rotated through a rotation arc set by a user, said catch contacts said flange so as to prohibit further rotation of said control rod, thereby limiting an amount of hot water that flows through said device, and the user changes said rotation arc by removing said cap from said barrel portion, rotating said cap relative to said barrel portion, and reinstalling said cap.

* * * * *